R. SYKORA.
FRICTION DRIVE MECHANISM.
APPLICATION FILED AUG. 12, 1920.

1,401,505. Patented Dec. 27, 1921.

INVENTOR:
Rudolf Sykora
by Macleod Calver Copeland Dike
Attys.

UNITED STATES PATENT OFFICE.

RUDOLF SYKORA, OF BOSTON, MASSACHUSETTS.

FRICTION DRIVE MECHANISM.

1,401,505.     Specification of Letters Patent.     Patented Dec. 27, 1921.

Application filed August 12, 1920. Serial No. 403,045.

*To all whom it may concern:*

Be it known that I, RUDOLF SYKORA, a citizen of the United States, residing at Boston, county of Suffolk, State of Massachusetts, have invented a certain new and useful Improvement in Friction Drive Mechanisms, of which the following is a specification, reference being had therein to the accompanying drawings.

The invention relates to a new and useful improvement in friction driving mechanism. It relates especially to a friction driving mechanism comprising two rotary disks, one of said disks being a driving disk and the other a driven disk, and having combined therewith a friction pulley which engages with both of said disks, whereby the rotary movement of the driving disk is communicated to the driven disk. One object of the invention is to provide automatic means whereby any variation in the load upon the driven disk causes the distance between the two disks to increase or diminish, thereby increasing or diminishing the friction according to the increase or diminution of the load. Another object of the invention is to provide a friction pulley between the two disks to transmit the friction of the driving disk to the driven disk, and to provide means for adjusting the friction pulley toward and from the centers of the disks, so that as the distance is increased from the center of one disk, it is decreased from the center of the other disk, thereby varying the speed of the driven disk with relation to the speed of the driving disk.

The invention will be fully understood from the following description when taken in connection with the accompanying drawings, and the novel features thereof will be pointed out and clearly defined in the claims at the close of this specification.

In the drawings, Figure 1 is a plan view of mechanism embodying the invention.

Figure 1:
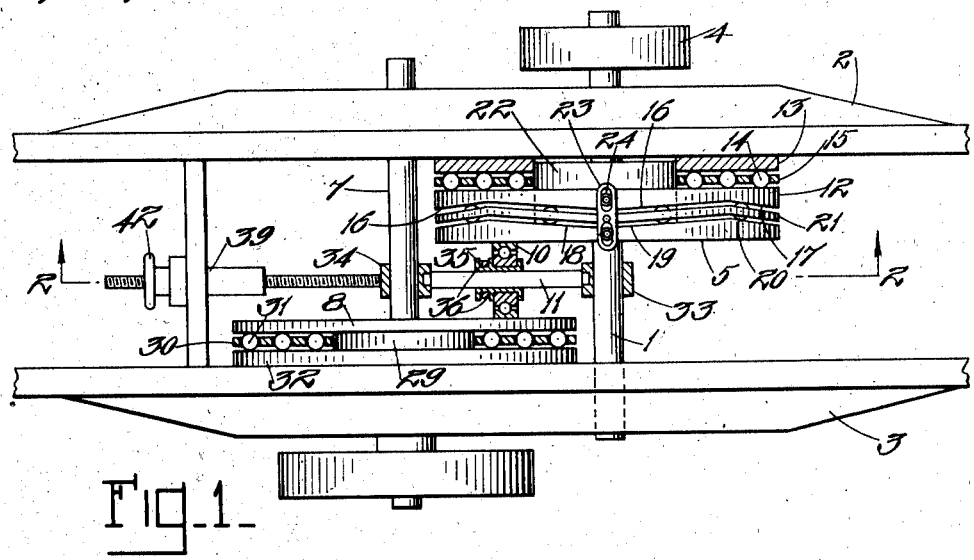
Figure 2:
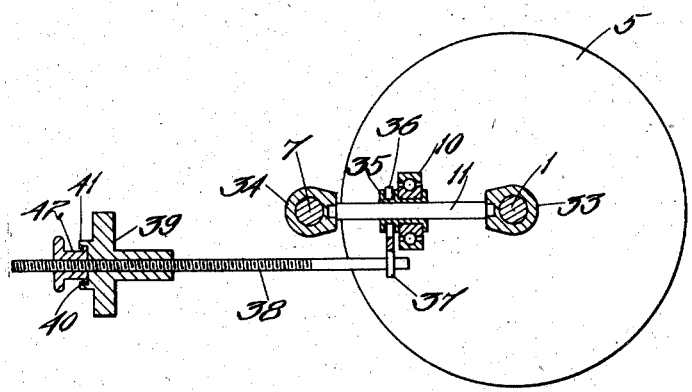
Fig. 2 is a section taken on line 2—2 of Fig. 1.
Figure 3:
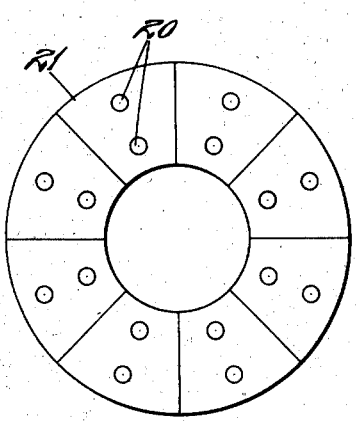
Fig. 3 is a detail view in elevation of one of the intermediate cam faced disks which forms part of the automatic mechanism for moving the driving disk toward the driven disk to control the variation in pressure according to the load.
Figure 5:
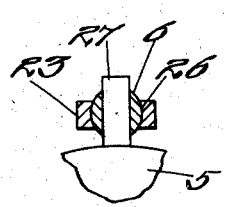
Fig. 5 is a sectional view on line 5, 5 of Fig. 4.
Figure 4:
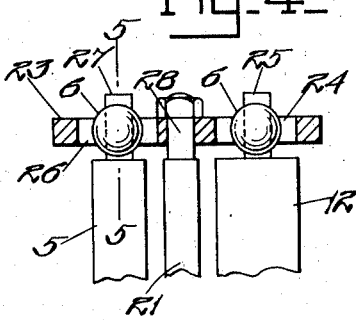
Fig. 4 is an enlarged sectional detail view of the slotted link connecting the driving disk with the loose disk and intermediate ball carrier.

Referring now to the drawings, 1 represents a driving shaft journaled in suitable bearings in frame members 2—3, and driven by any suitable means, as for instance, through a driving pulley 4 mounted upon said shaft 1.

A driving friction disk 5 is provided with a hub 22. Said disk and hub rotates with said shaft 1, preferably being integral therewith. Said shaft is slidable axially in its bearings, carrying with it the driving disk 5 and the hub 22.

A driven shaft 7 is journaled in suitable bearings, being shown as journaled in the frame members 2—3 and is not slidable axially. Mounted fast on said shaft 7 is the driven friction disk 8.

The driving disk 5 has driving connection with the driven disk 8, preferably by means of a ball friction pulley 10 mounted on shaft 11. Any other suitable driving connection between the two disks may, however, be employed.

Intermediate the driving disk 5 and the side frame member 2 are the two disks 12 and 13 spaced somewhat apart from each other. The disk 12 is mounted on the hub 22 of the friction disk 5, somewhat loosely, with just a sufficiently tight fit, so that if there is nothing to oppose its rotation, it will rotate with the shaft 1, but fits sufficiently loosely so that if there is opposition to the rotation of the disk 12, the disk 5 and shaft 1 may rotate independently of the disk 12. The disk 13 is stationary, the hub 22 passing loosely through said disk. The disk 13 may be made stationary by securing it to the frame 2 or in any other suitable manner. Between the disks 12 and 13, there are preferably introduced anti-friction balls 14 which are held in circular pockets or slots in a ball-carrying disk or cage 15 between said disks 12 and 13.

The adjacent faces of the two disks 12 and 13 are flat and parallel with each other. The opposite face of the disk 12 is formed with an annular cam surface which extends from the outer periphery radially inward for some distance, the cam face consisting of a succession of inclines 16 and declines 17 alternating with each other, and the adjacent surface of the driving disk 5 is formed with a series of inclines 18 and declines 19, the inclines on one disk being normally adjacent the declines of the other disk and complementary thereto. Intermediate between the two disks 12—5 are a plurality of balls 20 which are held in pockets in a ball-carrying cage or disk 21. The opposite faces of said ball-carrying disk 21 are formed with inclines and declines complementary to the adjacent faces of the disks 5 and 12.

A link 23 is formed with an elongated slot 24 near one end with which there loosely engages a ball 6 carried by a pin 25 which projects from the periphery of the disk 12, and is also provided near its other end with an elongated slot 26 with which there engages a ball 6 carried by a pin 27 which projects from the periphery of the disk 5. A pin 28 projects from the periphery of the intermediate ball carrier 21 and is pivotally engaged with said link 23 in its middle. Said balls are apertured to permit the pins to pass loosely through them, thus allowing a slight axial movement of the pins. The balls form a universal joint for the pins with the slot. The elongated slots 24 and 26 allow the driving disk 5 an axial movement with relation to the disk 12. Said pin 28 serves as a pivot for the link, so that the link is capable of a swivel movement on said pivot. This swivel connection allows for a slight rotary movement of disks 12 and 5 in opposite directions. The driven disk 8 is preferably provided with a hub 29. Mounted loosely upon the hub is a ball carrier 30 formed with pockets carrying antifriction balls 31 which lie between the driven disk 8 and a stationary disk 32 which is fast to the frame 3.

The shaft 11 on which the ball friction pulley 10 is mounted, is journaled at its two opposite ends in the boxes 33 and 34, which are respectively mounted on the shafts 1 and 7, the boxes being loose on said shafts so that the shafts may turn without rotating said boxes. The said friction pulley 10 is loosely mounted on the shaft 11 in such manner as to be axially slidable thereon. On the shaft 11 is loosely mounted a spool 35 on which the friction pulley is mounted so as to be rotatable thereon.

The spool 35 is provided with an annular peripheral groove which is engaged by the arms 36—36 of the fork 37. The shank of said fork is mounted fast on a screw-threaded shaft 38. The shaft 38 passes through a support 39 in which it is journaled so as to slide longitudinally therein. A feed nut 42 is tapped to engage with the threaded portion of said shaft and is provided with an annular flange 40 which engages with an annular groove formed by a flange 41 projecting from the support 39 so that when the nut is rotated, the shaft 38 will be moved axially. When the feed nut is rotated, the shaft 38 acts as a feed for the fork 37, causing the fork to travel in one direction or the other with said feed shaft, according to the direction of rotation of said feed nut. Inasmuch as the arms of the fork straddle the spool 35 which is connected with the friction pulley 10, the movement of the fork will move the friction ball pulley axially on the shaft 11. When it is moved in a direction to bring the friction pulley nearer the periphery of the driving disk 5, it will at the same time move the friction pulley nearer to the center of the driven disk 8, thus increasing the speed of rotation of the driven disk 8. This increases the speed of shaft 7. When the friction pulley slides in the reverse direction on the shaft 11 so as to bring it nearer to the center of the driving disk 5, it will diminish the speed of rotation of the driven disk 8.

When the members 5 and 12 are in the position shown in Fig. 1 so that the apices of the cam faces of the disk 5 and the low points of the cam faces of the disk 12 are in a line parallel with the shaft 1, the said disks 5, 12 and 21 will be in their most compact form in relation to each other and in such position, there will be the least frictional engagement between the disk 5 and the friction pulley 10. Now when the driving shaft begins to rotate, the friction disk 5 will begin to rotate with it and with relation to the disk 12. This will gradually cause the balls of the carrier 21 to come between those parts of the cam faces which, according to the direction of rotation of the shaft 1, are upwardly inclined, thereby causing an increase in pressure between the friction disks 5 and 8. Disk 5 will rotate with shaft 1 independently of members 21 and 12 until the pressure is greater than the load.

If the load increases on the shaft 7 so that there is not sufficient friction transmitted by the driving disk 5 through the pulley 10 to the driven disk 8 to rotate the disk 8 against the load on the shaft 7, then the ball carrier 19 will rotate a little farther to bring the balls 20 farther up the incline until the driving disk 5 is pushed far enough outward axially to still further tighten the fit between the ball pulley 10 and the two disks 5 and 8, so that the disk 8 will be rotated and thus rotate the shaft 7. It will thus be seen that there is an automatic adjustment of the driving disk 5 and the intermediate friction pulley 10 with relation to the driven disk 8 to accommodate variations in the load on the driven shaft 7. Thus, the increase of pressure between the cam faced members 5, 12 and 21 is proportionate to the increase of load, thereby avoiding unnecessary resistance in the consumption of energy.

It is also apparent from the previous description of the means for adjusting the position of the friction pulley with relation to the centers of the two disks 5 and 8, that the speed of the driving disk with relation to the driven disk, or vice versa, may be adjusted as desired.

I have referred to the cam faces on the disks as having inclines 16 and 18 and declines 17 and 19, assuming that the driving disk and shaft are turning over toward the left as viewed in Fig. 1. The so-called declines are preferably exactly corresponding in length and angle as the inclines, so that if desired the machine may run in the reverse direction, and in that case, the faces 17 and 19 would become the inclines and the faces 16 and 18 would become the declines.

What I claim is—

1. A variable driving mechanism consisting of a driving shaft having a friction disk mounted thereon, a driven member having a friction disk adjacent said first friction disk, a friction pulley which is adapted to engage with both of said friction disks, a disk loose on said driving shaft on the opposite side of said driving disk from said driven disk, said driving disk being formed with a series of cam surfaces, said loose disk being also formed with a series of cam surfaces coöperating with the cam surfaces on the driving disk, anti-friction balls between said cam faced disks, said driving disk and loose disk being capable of rotation independently of each other and means controlled by the load so as to cause the driving disk and the loose disk to rotate together as soon as the pressure surpasses the load.

2. A friction driving mechanism consisting of a rotary driving shaft having a friction disk mounted thereon and rotating therewith, a driven shaft parallel with said driving shaft and having a friction disk mounted thereon, a third shaft intermediate said two friction disks whose axis is at right angles to said driving shaft and driven shaft, a friction pulley mounted on said third shaft and engaging with both of the said friction disks, the said pulley being so mounted as to be movable in an axial direction thereof to respond to varying pressures on its periphery, and means controlled by the increase in load on the driven shaft to cause the said driving disk to increase the pressure on said friction pulley and thereby cause the said friction pulley to increase its pressure on the driven disk to balance the pressure between the driving disk and the driven disk.

3. A friction driving mechanism consisting of a rotary driving shaft having a friction disk mounted thereon and rotating therewith, a driven shaft parallel with said driving shaft and having a friction disk mounted thereon, a third shaft intermediate said two friction disks at right angles to said driving shaft and driven shaft and supported at its opposite ends in boxes loosely mounted on said driving shaft and driven shaft, a friction pulley mounted on said third shaft and engaging with both of said friction disks, said pulley and its shaft being slightly movable to vary the pressure of the pulley on said disks, and means controlled by the increase in load on the driven shaft to cause the said driving disk to exert a greater pressure on the intermediate friction pulley and thereby cause the said intermediate friction pulley to act with greater pressure on the said driven disk to balance the pressure between the driving disk and the driven disk.

4. A friction driving mechanism consisting of a driving shaft having a friction disk mounted thereon and rotating therewith, a driven shaft parallel with said driving shaft and having a friction disk mounted thereon in a plane parallel with said driving disk, a third shaft intermediate said two friction disks and parallel with the planes of said friction disks and supported at its opposite ends in boxes through which said driving shaft and driven shaft loosely pass, and a friction pulley mounted on said third shaft which engages with both of said friction disks.

5. A variable driving mechanism consisting of a driving shaft having a friction disk mounted thereon and rotating therewith, a driven member having a friction disk adjacent said first friction disk, means whereby said driving disk is adapted to have a frictional driving connection with said driven disk, a second disk loose on said driving shaft on the opposite side of said driving disk from said driven disk, said loose disk being spaced away from the driving disk, said driving disk being formed with a series of cam surfaces in annular arrangement on its face, said loose disk being also formed with a series of cam surfaces in annular arrangement coöperating with the cam surfaces on the driving disk, a plurality of anti-friction balls between said cam faced disks, said loose disk being capable of a limited rotary movement independent of said driving disk to change the relative positions of the apices of the cam faces of the two disks to cause a wedging action of the balls and thereby force the driving disk axially toward said driven disk to control the frictional driving connection between the driving disk and the driven disk.

6. A variable driving mechanism consisting of a driving shaft having a friction disk mounted thereon and rotating therewith, a driven member having a friction disk adjacent said first friction disk, means whereby said driving disk is adapted to have a frictional driving connection with said driven disk, a second disk loose on said driving shaft on the opposite side of said driving disk from said driven disk, said loose disk being spaced away from the driving disk, said driving disk being formed with a series of cam surfaces in annular arrangement on its face, said loose disk being also formed with a series of cam surfaces in annular arrangement coöperating with the cam surfaces on the driving disk, a plurality of anti-friction balls between said cam faced disks, said loose disk being capable of a limited rotary movement with relation to said driving disk to change the relative positions of the apices of the cam surfaces of the two disks to cause a wedging action of the balls and thereby force the driving disk axially toward said driven disk to control the frictional driving connection between the driving disk and the driven disk, a ball carrier disk in which balls are held between said driving disk and loose disk, said ball carrier having on its opposite faces cam surfaces coöperating with the cam surfaces of the adjacent disks and a slotted link having intermediate its ends a pivot connection with said ball carrier disk and also near its opposite ends pivot connections with said driving disk and loose disk.

7. A variable friction driving mechanism consisting of a driving shaft having a hub with a friction disk mounted thereon and rotating therewith, a driven shaft having a friction disk mounted thereon adjacent said first friction disk, a friction pulley which is adapted to engage with both of said friction disks whereby the rotation of the driving shaft rotates the driven shaft through the medium of said friction disks and pulley, a disk mounted loosely on the hub of said driving disk on the opposite side of said driving disk from the said friction pulley, said driving disk and loose disk being spaced apart from each other, a ball carrier mounted loose on the hub of said driving disk intermediate between the said driving disk and said loose disk and having anti-friction balls which engage with both of said last two disks, said last two disks being each formed with a series of similar cam surfaces in annular arrangement on their proximate faces, the intermediate ball carrier having both faces formed with cam surfaces corresponding with the cam surfaces of the adjacent disks, the said loose disk and driving disk being capable of a limited rotary movement with relation to said ball carrier and thereby forcing the driving disk into greater frictional engagement with the friction pulley and thus increasing the frictional driving connection between the driving disk and the driven disk to meet an increase in the load on the driven shaft.

8. A variable friction driving mechanism consisting of a driving shaft having a hub with a friction disk mounted thereon and rotating therewith, a driven shaft having a friction disk mounted thereon adjacent said first friction disk, a friction pulley which is adapted to engage with both of said friction disks whereby the rotation of the driving shaft rotates the driven shaft through the medium of said friction disks and pulley, a disk mounted loose on the hub of said driving disk on the opposite side of said driving disk from the said friction pulley, said driving disk and loose disk being spaced apart from each other, a ball carrier mounted loose on the hub of said driving disk intermediate between the said driving disk and said loose disk and having anti-friction balls which engage with both of said last two disks, said last two disks being each formed with a series of similar cam surfaces in annular arrangement on their proximate faces, the intermediate ball carrier having both faces formed with cam surfaces corresponding with the cam surfaces of the adjacent disks, the said loose disk and driving disk being capable of a limited rotary movement with relation to said ball carrier and thereby forcing the driving disk into greater frictional engagement with the friction pulley and thus increasing the frictional driving connection between the driving disk and the driven disk to meet an increase in the load on the driven shaft, and a slotted link having intermediate its ends a pivot connection with said ball carrier and having at its ends a slotted pivot connection respectively with said driving disk and loose disk whereby the said driving disk and loose disk are permitted to rotate independently of each other.

9. A variable friction driving mechanism consisting of a driving shaft having a friction disk mounted firmly thereon, a driven shaft having a friction disk mounted firmly thereon adjacent said first friction disk, a friction pulley which is adapted to engage with both of said friction disks whereby the rotation of the driving shaft rotates the driven shaft through the medium of said friction pulley, the friction disk of the driving shaft having on the surface opposite the friction pulley a series of inclines and declines radially arranged at regular intervals, a hub fixed firmly to the said friction disk of the driving shaft, a ball carrier mounted loosely on the hub of said friction disk on the same side of the friction disk as the inclined and declined surfaces, a second disk fitting loosely on the hub of said friction disk, the said ball carrier being intermediate said two disks, the surface of the said second disk adjacent the ball carrier having inclined and declined surfaces corresponding with the surfaces of the said ball carrier, the opposite side of said second disk having a smooth surface parallel with that surface of the driving friction disk which is adjacent the friction pulley, a second ball carrier fitting loosely on the said hub of the friction disk adjacent the said second disk, a third disk fitting loosely on the hub of the driving disk and adjacent the said second ball carrier, said last disk being firmly attached to the frame of the machine.

10. A variable friction driving mechanism consisting of a driving shaft having a hub with a friction disk mounted thereon and rotating therewith, a driven shaft having a friction disk mounted thereon adjacent said first friction disk, a friction pulley which is adapted to engage with both of said friction disks whereby the rotation of the driving shaft rotates the driven shaft through the medium of said friction disks and pulley, a disk mounted loose on the hub of said driving disk on the opposite side of said driving disk from the said friction pulley, said driving disk and loose disk being spaced apart from each other, a ball carrier mounted loose on the hub of said driving disk intermediate between the said driving disk and said loose disk and having anti-friction balls which engage with both of said last two disks, said last two disks being each formed with a series of similar cam faced surfaces in annular arrangement on their proximate faces, the intermediate ball carrier having both faces formed with the cam surfaces corresponding with the cam surfaces of the adjacent disks, the said loose disk and driving disk being capable of a limited rotary movement with relation to said ball carrier and thereby forcing the driving disk into greater frictional engagement with the friction pulley and thus increase the frictional driving connection between the driving disk and the driven disk to meet an increase in the load on the driven shaft, and a slotted link having intermediate its ends a pivot connection with said ball carrier and having at its ends a slotted pivot connection respectively with said driving disk and loose disk, the said link having elongated slots near its opposite ends for the pivot connection of the driving disk and loose disk, said last two disks having pins projecting from the periphery thereof, anti-friction balls through which said pins pass and which engage with said elongated slots to form a universal pivot connection between the disks and the link.

11. A friction driving mechanism consisting of a driving shaft having a friction disk mounted thereon and rotating therewith, a driven shaft parallel with said driving shaft and having a friction disk mounted thereon in a plane parallel with said driving disk, a third shaft intermediate said two friction disks and parallel with the planes of said friction disks and supported at its opposite ends in boxes through which said driving shaft and driven shaft loosely pass, a friction pulley mounted on said third shaft which engages with both of said friction disks, said friction pulley having ball bearings and being provided with a spool which is slidably mounted on said third shaft, a slidable member which is slidable in a line parallel with the axis of said third shaft, and means connected with said slidable member which engages with said spool whereby the axial movement of the said slidable member moves said friction pulley to vary the radial distance from the center of the friction disks at which the said friction pulley will engage said disks.

12. A friction driving mechanism consisting of a driving shaft having a friction disk mounted thereon and rotating therewith, a driven shaft parallel with said driving shaft and having a friction disk mounted thereon in a plane parallel with said driving disk, a third shaft intermediate said two friction disks and parallel with the planes of said friction disks and supported at its opposite ends in boxes through which said driving shaft and driven shaft loosely pass, a friction pulley mounted on said third shaft which engages with both of said friction disks, said friction pulley being provided with a spool which is slidably mounted on said third shaft, a slidable member which is slidable in a line parallel with the axis of said third shaft and which has a fork which engages with said spool whereby the axial movement of the said slidable member moves said friction pulley to vary the radial distance from the center of the friction disks at which the said friction pulley will engage said disks, said slidable member having a screw-threaded portion and a feed nut engaging therewith, whereby said slidable member may be moved longitudinally.

13. In combination with a rotary shaft, a driving disk mounted thereon and rotating therewith, a second disk loose on said driving shaft and spaced away from the driving disk, said driving disk being formed with a series of cam surfaces in annular arrangement on its face, said loose disk being also formed with a series of cam surfaces in annular arrangement coöperating with the cam surfaces on the driving disk, and a plurality of anti-friction rollers between said cam faced disks, said loose disk being capable of a limited rotary movement independent of said driving disk to change the relative positions of the apices of the cam faces of the two disks to cause a wedging action on the rollers, and thereby force the driving disk axially away from the loose disk.

14. In combination with a rotary shaft, a driving disk mounted thereon and rotating therewith, a second disk loose on said driving shaft and spaced away from the driving disk, said driving disk being formed with a series of cam surfaces in annular arrangement on its face, said loose disk being also formed with a series of cam surfaces in annular arrangement coöperating with the cam surfaces on the driving disk, a plurality of anti-friction rollers between said cam faced disks, said loose disk being capable of a limited rotary movement independent of said driving disk to change the relative positions of the apices of the cam faces of the two disks to cause a wedging action on the rollers, and thereby force the driving disk axially away from the loose disk, and a carrier in which the rollers are held between said driving disk and loose disk, said carrier having on its opposite faces cam surfaces which are parallel with the adjacent cam surfaces of the said disks.

15. In combination with a rotary shaft, a driving disk mounted thereon and rotating therewith, a second disk loose on said driving shaft and spaced away from the driving disk, said driving disk being formed with a series of cam surfaces in annular arrangement on its face, said loose disk being also formed with a series of cam surfaces in annular arrangement coöperating with the cam surfaces on the driving disk, a plurality of anti-friction rollers between said cam faced disks, said loose disk being capable of a limited rotary movement independent of said driving disk to change the relative positions of the apices of the cam faces of the two disks to cause a wedging action on the rollers, and thereby force the driving disk axially away from the loose disk, and a carrier in which the rollers are held between said driving disk and loose disk, said carrier having on its two opposite sides cam surfaces, the contours of the cam surfaces on the two sides of the carrier being parallel to each other and to the cam surfaces of the two disks.

16. In combination with a rotary shaft, a driving disk mounted thereon and rotating therewith, a second disk loose on said driving shaft and spaced away from the driving disk, said driving disk being formed with a series of cam surfaces in annular arrangement on its face, said loose disk being also formed with a series of cam surfaces in annular arrangement coöperating with the cam surfaces on the driving disk, a plurality of anti-friction rollers between said cam faced disks, said loose disk being capable of a limited rotary movement independent of said driving disk to change the relative positions of the apices of the cam faces of the two disks to cause a wedging action on the rollers, and thereby force the driving disk axially away from the loose disk, a roller carrier in which the rollers are held between said driving disk and loose disk, said roller carrier having on its opposite faces cam surfaces coöperating with the cam surfaces of the adjacent disks, and a slotted link having intermediate its ends a pivot connection with said ball carrier and also having near its opposite ends pivot connections with said driving disk and loose disk.

17. An automatic load adjuster comprising two disks coaxial with each other and spaced slightly apart from each other, the adjacent faces of said disks being each formed with a series of cam surfaces in annular arrangement on its face, said two sets of cam surfaces being parallel to each other, and a plurality of anti-friction balls between said cam-faced disks.

18. An automatic load adjuster comprising two disks coaxial with each other and spaced slightly apart from each other, the adjacent faces of said disks being each formed with a series of cam surfaces in annular arrangement on its face, said two sets of cam surfaces being parallel to each other, a plurality of anti-friction balls between said cam-faced disks, and a ball carrier in which the balls are held between said two disks, said carrier having on its opposite sides cam surfaces, the contours of the cam surfaces on the two sides of the carrier being parallel to each other and to the cam surfaces of the two disks.

19. In combination with a rotary shaft, a driving disk mounted thereon and rotating therewith, a second disk loose on said shaft, each of said disks being formed with a series of cam surfaces which are arranged in direct succession one after another and which alternately pitch up and down with relation to the plane of the disk, at equal angles thereto, each upward pitch being followed directly by a downward pitch and each downward pitch being followed directly by an upward pitch without any intermediate level space, the cam surfaces of one disk being parallel with and spaced apart from the cam surfaces of the other disk, a plurality of anti-friction rollers between the cam surfaces of the two disks, and a carrier in which said rollers are held between said two disks, the cam surfaces which pitch in one direction and the rollers which are in contact therewith, being operative when the shaft rotates in one direction, and the cam surfaces which pitch in the other direction and the rollers which are in contact therewith, being operative automatically when the direction of rotation of the shaft is reversed, whereby the device acts as a clutch operative in both directions of rotation.

20. In combination with a rotary shaft, a driving disk mounted thereon and rotating therewith, a second disk loose on said shaft, each of said disks being formed with a series of cam surfaces, the cam surfaces of one disk being parallel with and spaced apart from the cam surfaces of the other disk, a plurality of anti-friction rollers between the cam surfaces of the two disks, and a carrier in which said rollers are held between said two disks, said carrier having two sets of cam surfaces, the contours of both sets of cam surfaces on the carrier being parallel to each other and to the cam surfaces of the two disks.

In testimony whereof I affix my signature.

RUDOLF SYKORA.